(No Model.)
W. V. PERRY.
CAR COUPLING.
No. 310,720. Patented Jan. 13, 1885.
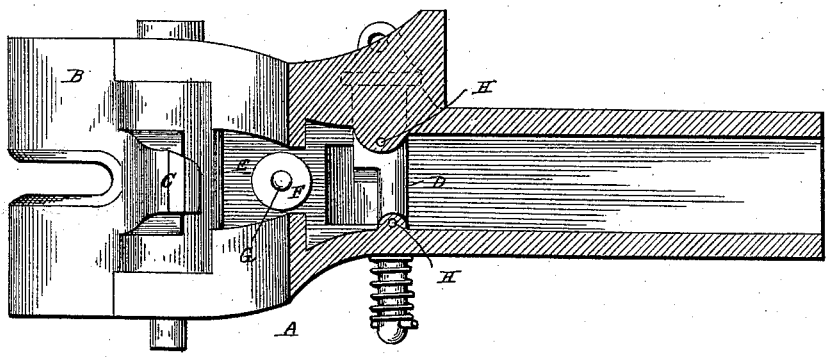
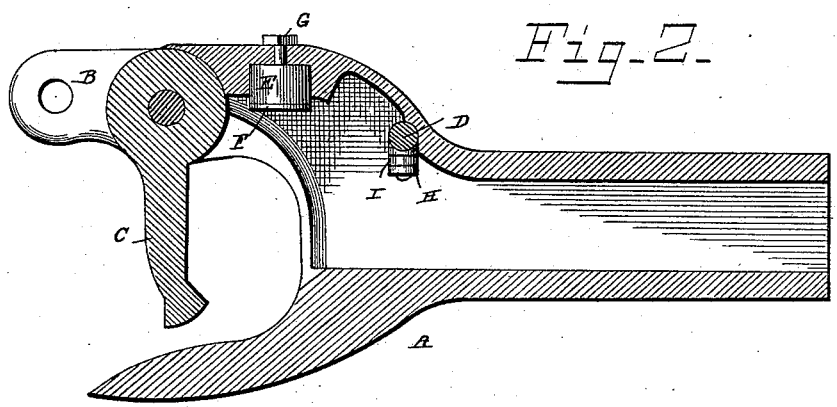
WITNESSES
Edwin L. Jewell.
J. J. McCarthy,
INVENTOR
W. V. Perry
By C. M. Alexander
ATTORNEY

UNITED STATES PATENT OFFICE.

WILLIAM V. PERRY, OF CHICAGO, ILLINOIS.

CAR-COUPLING.

SPECIFICATION forming part of Letters Patent No. 310,720, dated January 13, 1885.

Application filed June 18, 1884. (No model.)

*To all whom it may concern:*

Be it known that I, WILLIAM V. PERRY, a citizen of the United States, residing at Chicago, in the county of Cook and State of Illinois, have invented certain new and useful Improvements in Car-Couplings, of which the following is a specification, reference being had therein to the accompanying drawings.

My invention relates to improvements in car-couplings, and is designed to prevent the sudden and destructive shock and jar attending the violent contact of two metallic bodies, as occurs in the operation of coupling cars; and, further, it is designed to lessen the shock and strain of the latch-pin when the cars are started or when they are already in motion.

In describing the device reference will be had to the accompanying drawings, showing the improvements attached to a draw-bar, and in which—

Figure 1 represents a side view, partly in section, of a draw-bar, and Fig. 2 a longitudinal section of the same.

A represents a draw-bar of approved construction, carrying at its front end a hinged lever, B, one arm, C, of which engages behind a beveled spring-actuated pin, D.

The improvement consists in placing securely in the side of the draw-bar a buffer, E, of elastic material—for instance, rubber—so situated as to have the arm C engage with it when it passes behind the pin D, thus preventing the destructive jar of the arm striking the metal of the draw-bar. The buffer has a bearing plate or surface, F, and a bolt, G, which secures both in a recess in the draw-bar, as shown. On the inside of said draw-bar, on one side of each of the passages for the pin D, is raised a lug or flange, H, and between it and the pin is placed a metal-faced elastic buffer, I, against which the said pin rests, and which is secured to the flange by a bolt or otherwise. This buffer is so placed that the pin will bear against it when the lever-arm is behind the said pin and pressing on it, thus preventing jars and shocks tending to injure the coupling. The buffers are not necessarily circular, as shown, but may be of any shape.

Having described the device, what I claim is—

1. In combination with a coupling-lever in a car-coupling, an elastic buffer placed within the draw-bar, so as to engage with one end of the said lever as it closes in the draw-bar and thus break the shock of contact.

2. In a car-coupling, an elastic buffer placed on the bearing side of a latch-pin and against which the pin is adapted to set to break the shock of contact.

3. In a car-coupling, an elastic buffer so placed as to engage with one of the arms of a coupling-lever, in combination with an elastic buffer engaging with the bearing side of a latch-pin which secures the said lever-arm, the buffers breaking the shock of contact.

4. An elastic buffer having a metallic face-plate and a securing-bolt, in combination with a flange raised on one side of the latch-pin bearings in a draw-bar, to which flange the buffer is secured.

5. The combination, in a car-coupling, of an elastic buffer having a metallic face-plate and a securing-bolt, and resting in a recess in a draw-bar, with one or more elastic buffers having metallic face-plates and securing-bolts, and fastened to flanges raised on one side of the latch-pin bearings, the buffers acting to break the shock of coupling and starting.

In testimony whereof I affix my signature in presence of two witnesses.

WILLIAM V. PERRY.

Witnesses:
 E. A. WHIPPLE,
 G. L. BURKHARDT.